United States Patent [19]
Kuroda et al.

[11] Patent Number: 6,012,560
[45] Date of Patent: Jan. 11, 2000

[54] POWER TRANSMITTING SYSTEM FOR VEHICLE

[75] Inventors: Koji Kuroda; Kazunori Kobayashi; Kazuyuki Suetake, all of Wako, Japan

[73] Assignee: Honda Giken Kogyo Kabushiki Kaisha, Tokyo, Japan

[21] Appl. No.: 09/006,218

[22] Filed: Jan. 13, 1998

[30] Foreign Application Priority Data

Jan. 14, 1997 [JP] Japan ................................. 9-004865

[51] Int. Cl.[7] .................................................. B06K 17/34
[52] U.S. Cl. ........................... 192/35; 74/650; 192/70.12; 192/48.2; 192/49
[58] Field of Search ............................ 192/70.12, 70.23, 192/84.7, 35, 48.2, 49, 113.34; 475/88; 74/650, 665 F, 655 H, 665 T

[56] References Cited

U.S. PATENT DOCUMENTS

| | | | |
|---|---|---|---|
| 5,119,900 | 6/1992 | Watanabe, et al. | 180/245 |
| 5,341,893 | 8/1994 | Fukui et al. | 74/650 X |
| 5,584,776 | 12/1996 | Weilant, et al. | 475/213 |
| 5,690,002 | 11/1997 | Showalter | 192/35 X |
| 5,839,328 | 11/1998 | Showalter | 74/650 |
| 5,845,546 | 12/1998 | Knowles et al. | 74/650 |

FOREIGN PATENT DOCUMENTS

| | | |
|---|---|---|
| 40 39 392 C2 | 11/1995 | Germany . |
| 196 11 058 A1 | 9/1996 | Germany . |

Primary Examiner—Charles A Marmor
Assistant Examiner—Saúl Rodríguez
Attorney, Agent, or Firm—Armstrong, Westerman, Hattori, McLelland and Naughton

[57] ABSTRACT

In a power transmitting system, a clutch drive shaft driven through bevel gears and by an input shaft is laterally extensive and left and right electromagnetic clutches are disposed between opposite ends of the clutch drive shaft and left and right output shafts, respectively. A clutch body heated during the transmission of a power is disposed at a laterally outer location of the system to provide enhanced heat-radiatability, and an annular solenoid is disposed inside the clutch body. A bearing for supporting each of the opposite ends of the clutch drive shaft is disposed radially inside the solenoid. Thus, the lateral dimension of the power transmitting system is reduced.

9 Claims, 7 Drawing Sheets

POWER TRANSMITTING SYSTEM FOR VEHICLE

BACKGROUND OF THE INVENTION

1. Field of the Invention

The present invention relates to a power transmitting system for a vehicle, designed to transmit a driving force from an input shaft to which a driving force from an engine is inputted, to left and right output shafts through a clutch drive shaft disposed laterally of a vehicle body and through left and right electromagnetic clutches.

2. Description of the Related Art

In such conventional power transmitting system, clutch bodies of the left and right electromagnetic clutches are mounted at locations near the center of the power transmitting system (at an inner location in a lateral direction), and solenoids of the left and right electromagnetic clutches are disposed at positions laterally outwardly of the clutch bodies. Left and right bearings for supporting the left and right opposite ends of the clutch drive shaft with respect to a casing are disposed at positions laterally inwardly of the left and right clutch bodies.

However if a clutch body, disposed at a position lateraly inwardly of the solenoid, is heated with the transmission of power, there is a possibility that the radiation of heat from the clutch body will be blocked by the solenoid so that the solenoid becomes heated and, thus, its performance is adversely effected. If, on the other hand, the solenoid of the electromagnetic clutch and the bearings for supporting the clutch drive shaft are laterally in order to reduce the effect of heat on the solenoid, there is encountered a problem that the lateral dimension of the power transmitting system is increased.

SUMMARY OF THE INVENTION

Accordingly, it is an object of the present invention to enhance the discharge of heat from the electromagnetic clutches of the power transmitting system of the vehicle while reducing the lateral dimension of the power transmitting system.

To achieve the above object, according to the present invention, there is provided a power transmitting system for a vehicle comprising an input shaft to which a driving force from an engine is inputted, a clutch drive shaft extending laterally of a vehicle body and driven by the input shaft, left and right output shafts coaxially disposed on left and right opposite sides of the clutch drive shaft, left and right electromagnetic clutches disposed between the clutch drive shaft and the output shafts, the left and right electromagnetic clutches, each including a clutch body which is operable to transmit a driving force from the clutch drive shaft to an adjacent one of the output shafts and which is operated by an annular solenoid, each of the solenoids being disposed laterally inside, or "inboard" of, the clutch body with which each is associated, and left and right bearings for supporting opposite ends of the clutch drive shaft being disposed radially inwardly of the respective left and right solenoids.

With such arrangement, when an electric current is supplied to the solenoids, the clutch bodies associated with the respective energized solenoid are operated, so that the electromagnetic clutches are brought into their engaged state, thereby permitting the driving force from the input shaft to be transmitted to the left and right output shafts via the clutch drive shaft and the left and right electromagnetic clutches. Since the left and right solenoids are disposed laterally inboard of the respective left and right clutch bodies, the clutch bodies, which may become heated by the transmission of the driving force, can be located at position laterally outside of the respective solenoids to enhance the ability of heat generated by the driving force to be discharged by radiation to the outside of the power transmission system. In addition, since the left and right bearings for supporting the opposite ends of the clutch drive shaft are disposed radially inwardly of the left and right solenoids, the lateral dimension of the power transmitting system can be reduced.

The above and other objects, features and advantages of the invention will become apparent from the following description of the preferred embodiment taken in conjunction with the accompanying drawings.

BRIEF DESCRIPTION OF THE DRAWINGS

FIGS. 1 to 7 illustrate an embodiment of the present invention, wherein

FIG. 1 is an illustration of the entire arrangement of a four-wheel drive vehicle;

FIG. 2 is a plan view of the entire rear differential;

FIG. 3 is an enlarged view of the central portion of the differential shown in FIG. 2;

FIG. 4 is an enlarged view of the left hand portion of the differential shown in FIG. 2;

FIG. 5 is an enlarged view of the right hand portion of the differential shown in FIG. 2;

FIG. 6 is an enlarged sectional view taken along a line 6—6 in FIG. 4; and

FIG. 7 is an enlarged sectional view taken along a line 7—7 in FIG. 3.

DETAILED DESCRIPTION OF THE PREFERRED EMBODIMENT

The present invention will now be described by way of an embodiment with reference to the accompanying drawings.

Figure 1:
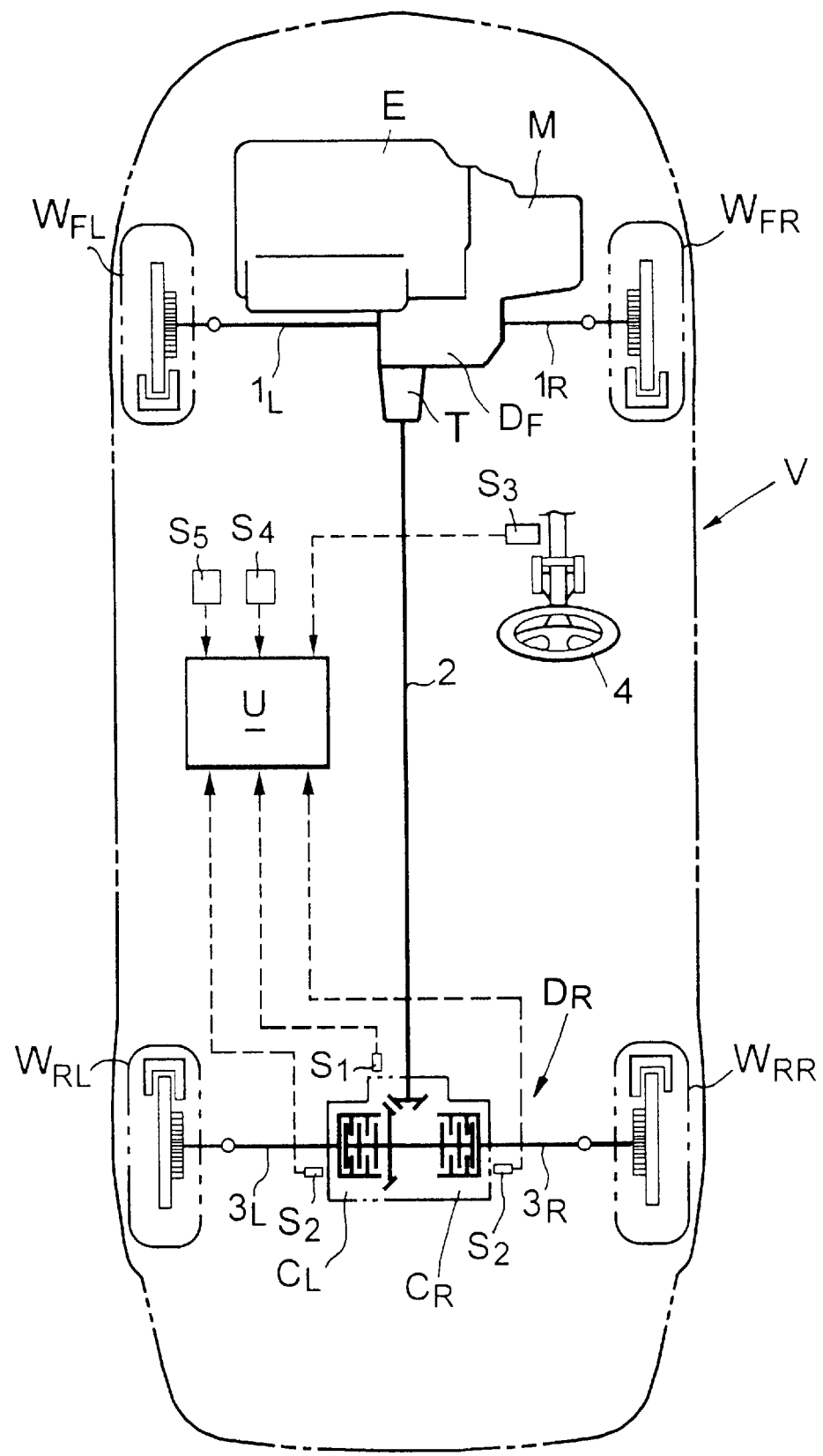
Figure 2:
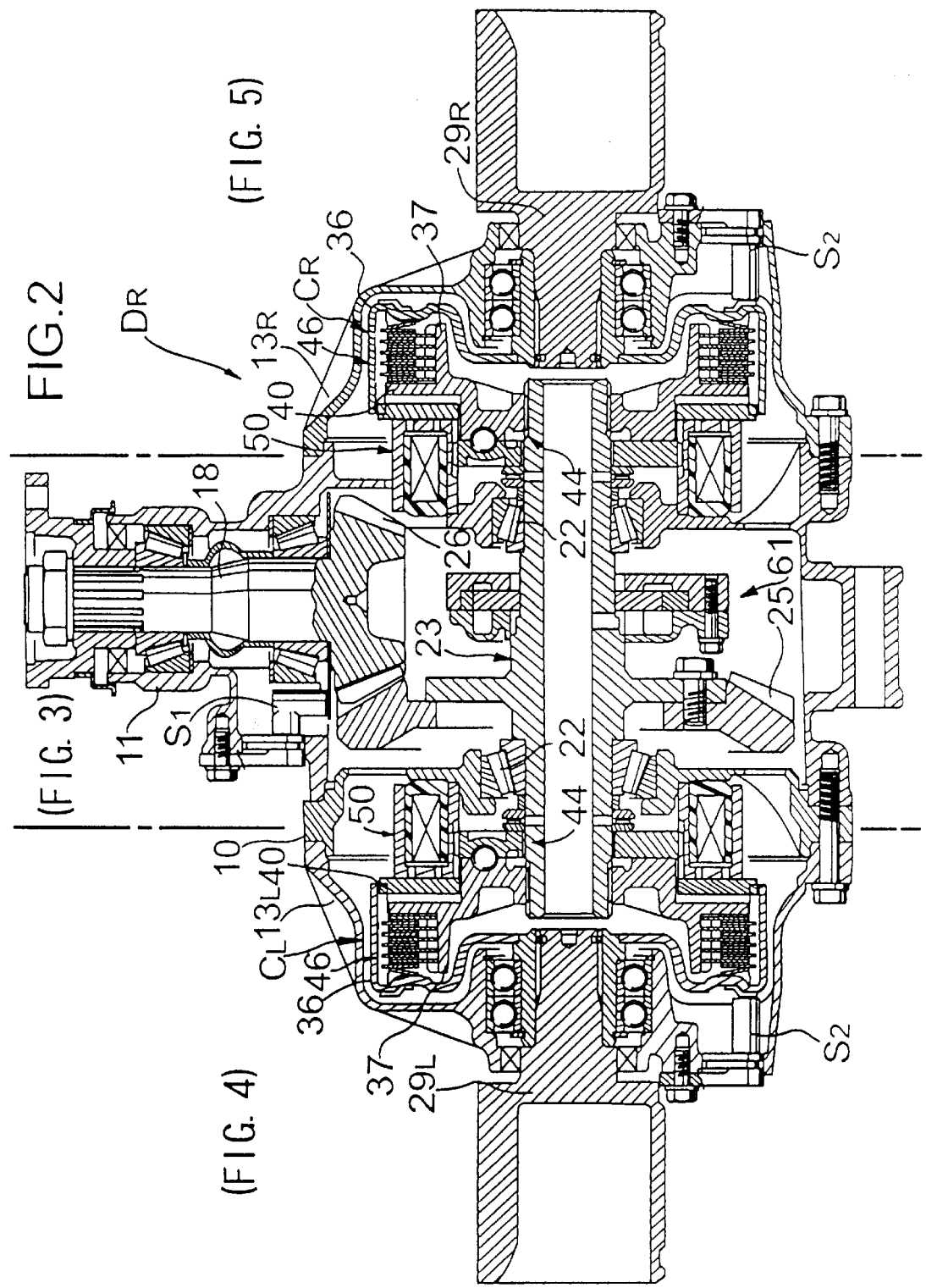

Referring to FIG. 1, a four-wheel drive vehicle V includes an engine E laterally mounted at a front portion of a vehicle body, a transmission M provided integrally with the engine E, a front differential $D_F$ which connects the transmission M to drive shafts $1_L$ and $1_R$ of left and right front wheels $W_{FL}$ and $W_{FR}$, a transfer T which connects the front differential $D_F$ to a propeller shaft 2, and a rear differential $D_R$ which connects the propeller shaft 2 to drive shafts $3_L$ and $3_R$ of left and right rear wheels $W_{RL}$ and $W_{RR}$. The rear differential $D_R$ is capable of controlling the transmission of a driving force to the drive shafts $3_L$ and $3_R$ of the rear wheels $W_{RL}$ and $W_{RR}$. When the transmission of the driving force is cut off, the vehicle is brought into a front wheel drive state in which only the front wheels $W_{FL}$ and $W_{FR}$ are driven, and when the driving force is transmitted, the vehicle is brought into a four-wheel drive state in which both of the front wheels $W_{FL}$ and $W_{FR}$ and the rear wheels $W_{RL}$ and $W_{RR}$ are driven. Further, in the four-wheel drive state, the rear differential $D_R$ is capable of controlling the distribution of the driving force to the left and right rear wheels $W_{RL}$ and $W_{RR}$ to any extent.

Connected to an electronic control unit U are a front wheel speed sensor $S_1$ for detecting a front wheel speed based on a number of rotations of the propeller shaft 2, a pair of rear wheel speed sensors $S_2$, $S_2$ for detecting rear wheel speeds based on numbers of rotations of the left and right drive shafts $3_L$ and $3_R$ of the rear wheels $W_{RL}$ and $W_{RR}$, a steering angle sensor $S_3$ for detecting a steering angle of a steering wheel 4, a yaw rate sensor $S_4$ for detecting a yaw rate of the vehicle body, and a lateral acceleration sensor $S_5$ for detecting a lateral acceleration of the vehicle body. The electronic control unit U controls left and right electromagnetic clutches $C_L$ and $C_R$ (which will be described hereinafter) mounted in the rear differential $D_R$ based on signals from the sensors $S_1$ to $S_5$.

The structure of the rear differential $D_R$ will be described with reference to FIGS. 2 to 7. The rear differential $D_R$ has a substantially laterally symmetric structure and hence, with the regard to the lateral symmetric portions, only the left one of the left and right portions will be described, and the duplicated description is omitted.

The rear differential $D_R$ includes a casing means which is divided into four portions: a center casing 11, a left side casing $13_L$ coupled to left side of the center casing 11 by a plurality of bolts 15 with an intermediate casing 10 interposed therebetween, and a right side casing $13_R$ coupled to a right side of the center casing 11 by a plurality of bolts 15.

An input shaft 18 is supported in the center casing 11 by a pair of tapered roller bearings 16 and 17, and coupled at its front end to a rear end of the propeller shaft 2 (see FIG. 1) through a coupling 19. The front wheel speed sensor $S_1$ is fixed to the center casing 11 by a bolt 21 in facing relation to a rotor 20 attached to the input shaft 18 to detect a number of rotations of the input shaft 18. A hollow clutch drive shaft 23 is supported at its opposite ends in the intermediate casing 10 and the center casing 11 through a pair of tapered roller bearings 22, 22, and a driven bevel gear 26 integrally formed at a rear end of the input shaft 18 is meshed with a follower bevel gear 25 fixed to the clutch drive shaft 23 by a bolt 24. The input shaft 18 and the clutch drive shaft 23 are in perpendicularly offset locations and are not in the same plane. Therefore, a follower bevel gear 25 and driven bevel gear 26, which are of a hypoid type, are used.

A left output shaft $29_L$ is supported in the left side casting $13_L$ through two ball bearings 27, 27. The left drive shaft $3_L$ (see FIG. 1) is coupled at its right end to a coupling 30 formed at a left end of the left output shaft $29_L$ protruding from the left side casing $13_L$. The rear wheel speed sensor $S_2$ fixed to the left side casing $13_L$ by a bolt 32 is in facing relation to a rotor 31 fixed to a clutch outer 36 rotated in unison with the left output shaft $29_L$ in order to detect the number of rotations of the left output shaft $29_L$.

A clutch body 46 of the left electromagnetic clutch $C_L$ accommodated in the left side casing $13_L$ includes a clutch inner 37 fixed to a left end of the clutch drive shaft 23, the clutch outer 36 fixed to the right end of the left output shaft $29_L$, a plurality of clutch disks 38 axially slidably but non-rotatably carried on an inner periphery of the clutch outer 36, a plurality of clutch plates 39 axially slidably but non-rotatably carried on an outer periphery of the clutch inner 37 and superposed alternately on the clutch disks 38, a clutch piston 40 formed integrally with the clutch inner 37 for bringing the clutch disks 38 and the clutch plates 39 into contact with each other, and a belleville spring 56 disposed between the leftmost clutch disk 38 and the clutch outer 26.

A ball cam mechanism 44 is provided on the outer periphery of the left end of the clutch drive shaft 23 and is comprised of a stationary cam member 41, a movable cam member 42 and a plurality of balls 43. A right side of the stationary cam member 41 is opposed to a left side of the tapered roller bearing 22 with a thrust bearing 45 interposed therebetween, and the movable cam member 42 is integrally formed on the radially inner periphery of the clutch inner 37. An outer peripheral surface of the stationary cam member 41 is spline-coupled at 48 to an inner peripheral surface of a coil housing 47 which will be described hereinafter, and an inner peripheral surface of the movable cam member 42 is spline-coupled at 49 to an outer peripheral surface of the clutch drive shaft 23.

Figure 6:
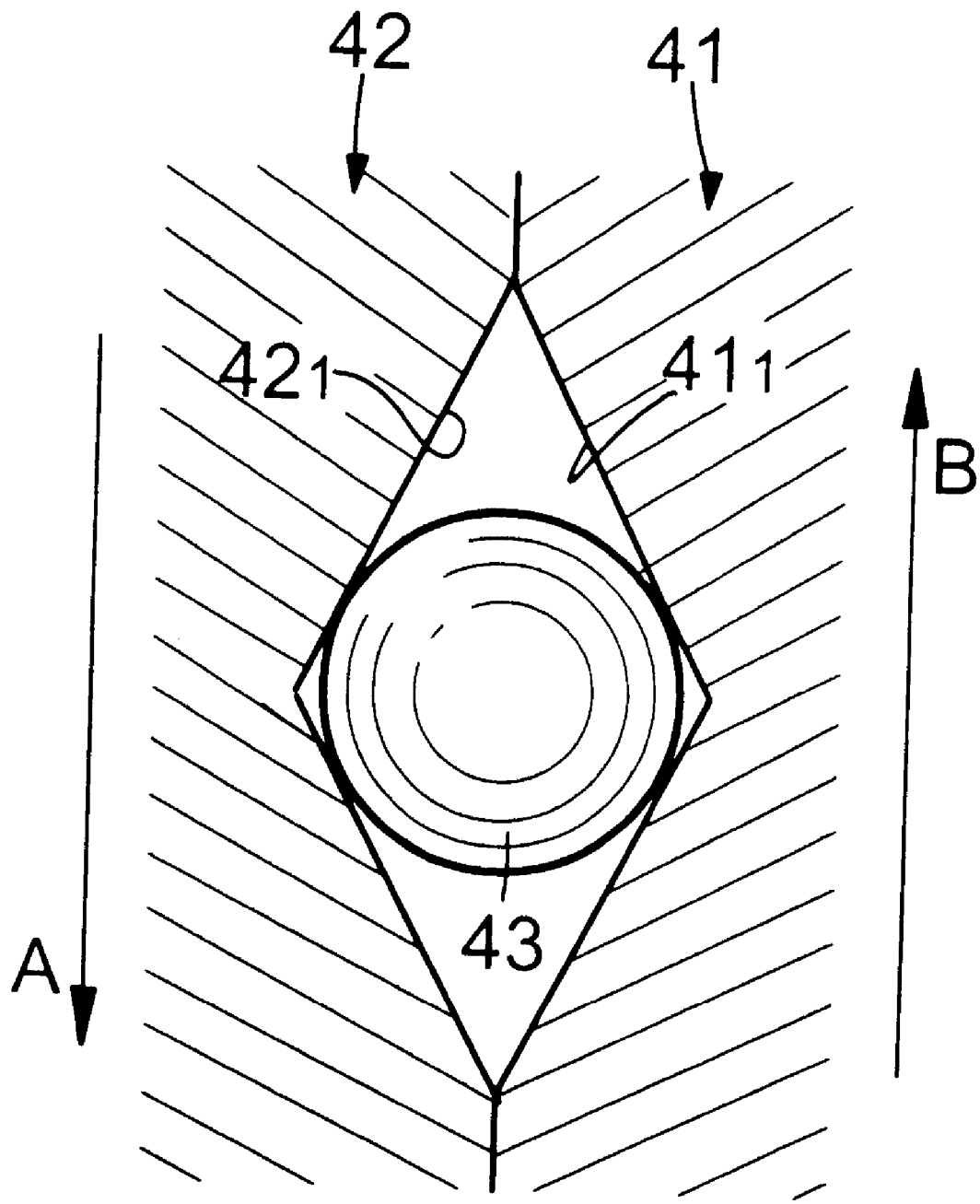

As can be seen by reference to FIG. 6 together with other drawing figures, triangular cam grooves $41_1$ and $42_1$ are defined at predetermined distances in opposed surfaces of the cam members 41 and 42 of the ball cam mechanism 44, and the balls 43 are disposed between the opposed cam grooves $41_1$ and $42_1$.

Figure 4:
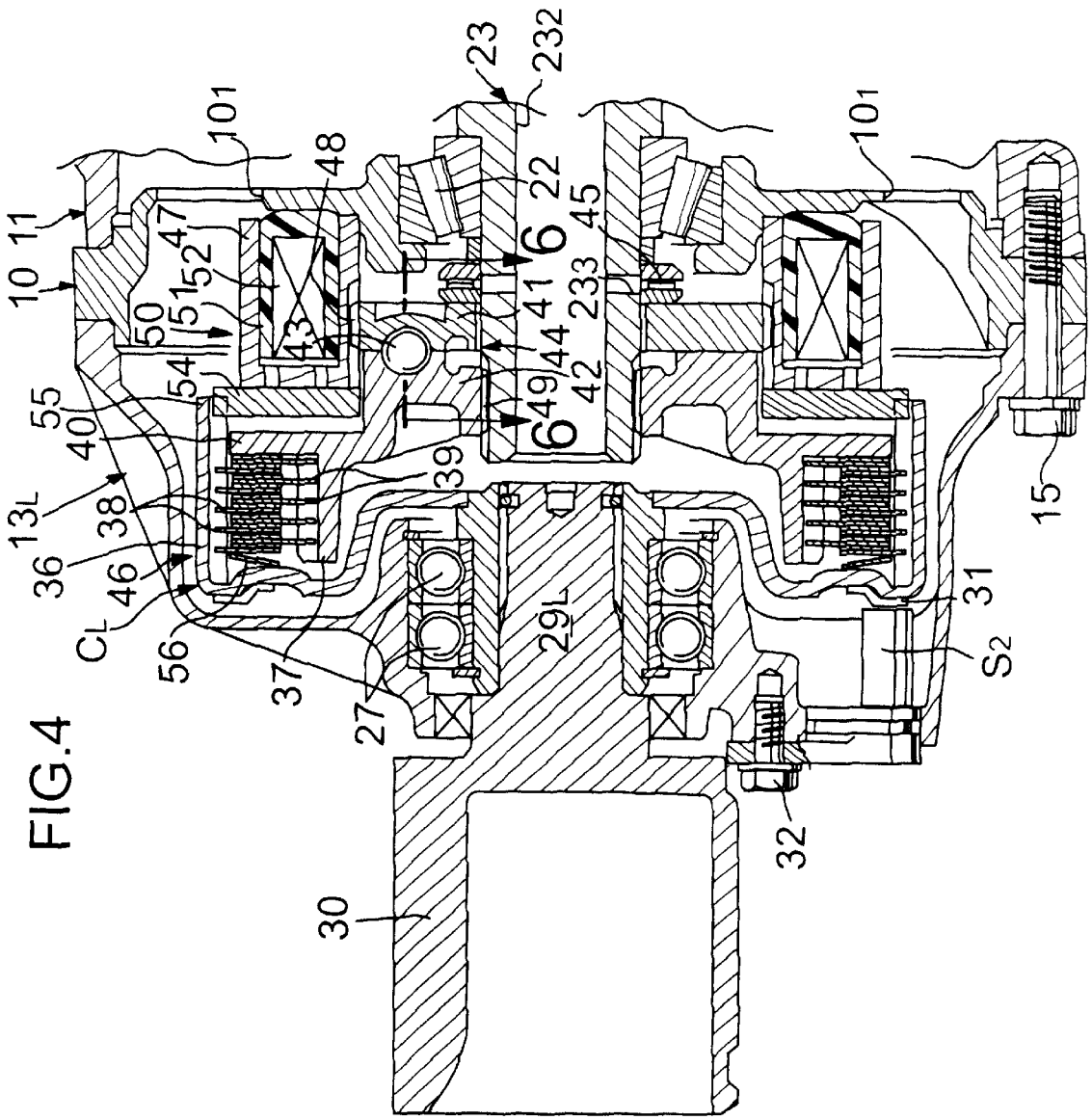
Figure 5:
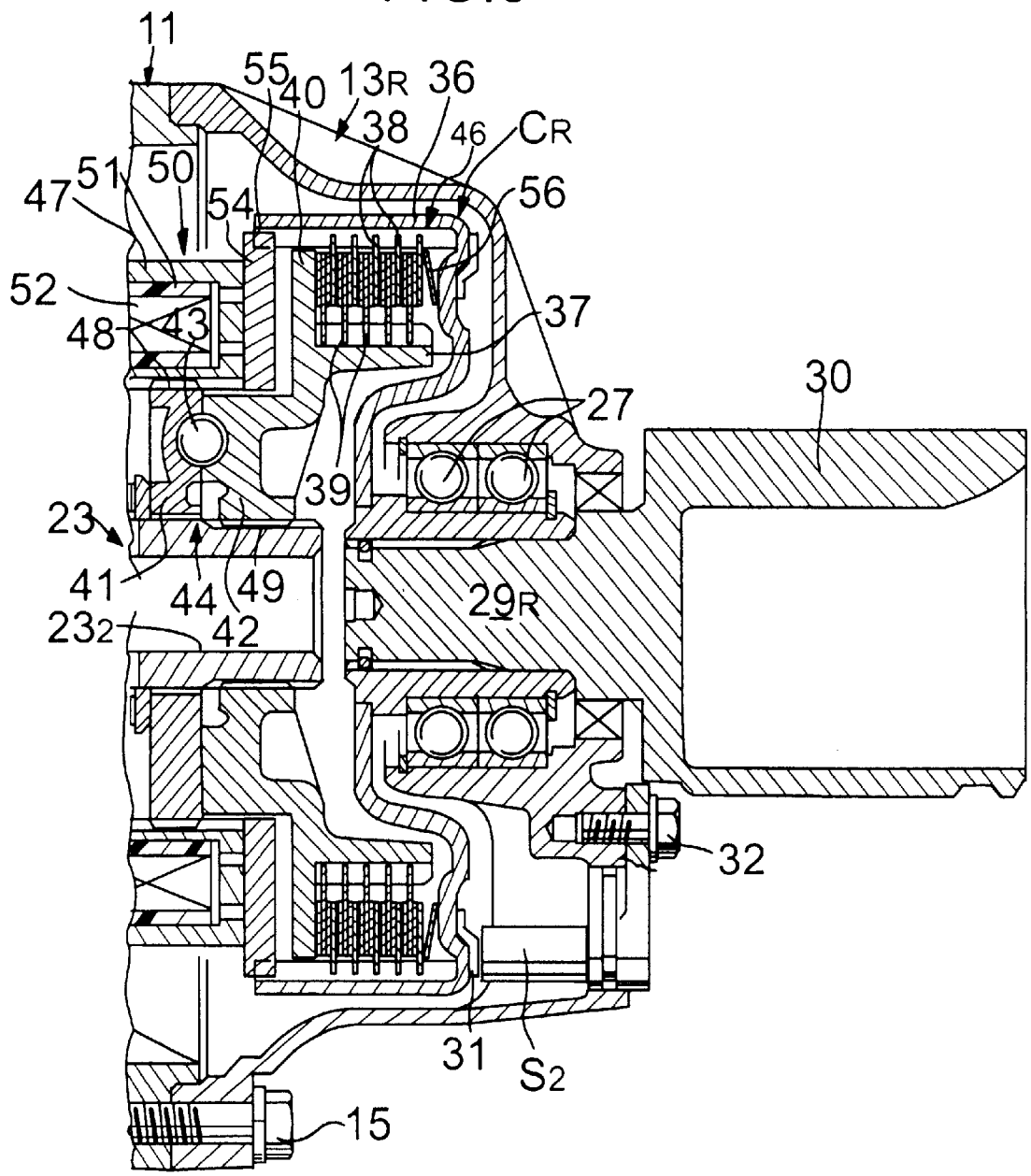

As can be seen from FIG. 4, a solenoid 50 is disposed radially outside the ball cam mechanism 44 and includes an annular coil 52 covered with an insulating material 51, an annular coil housing 47 which covers an inner peripheral surface, an outer peripheral surface and a left side of the coil 52, and an annular armature 54 disposed on a left side of the coil housing 47. The coil 52 is fixed to the intermediate casing 10 by a means which is not shown, and the coil housing 47 is supported for rotation about the clutch drive shaft 23 through the ball cam mechanism 44. An outer periphery of the armature 54 is spline-coupled at 55 to the clutch outer 36.

Figure 3:
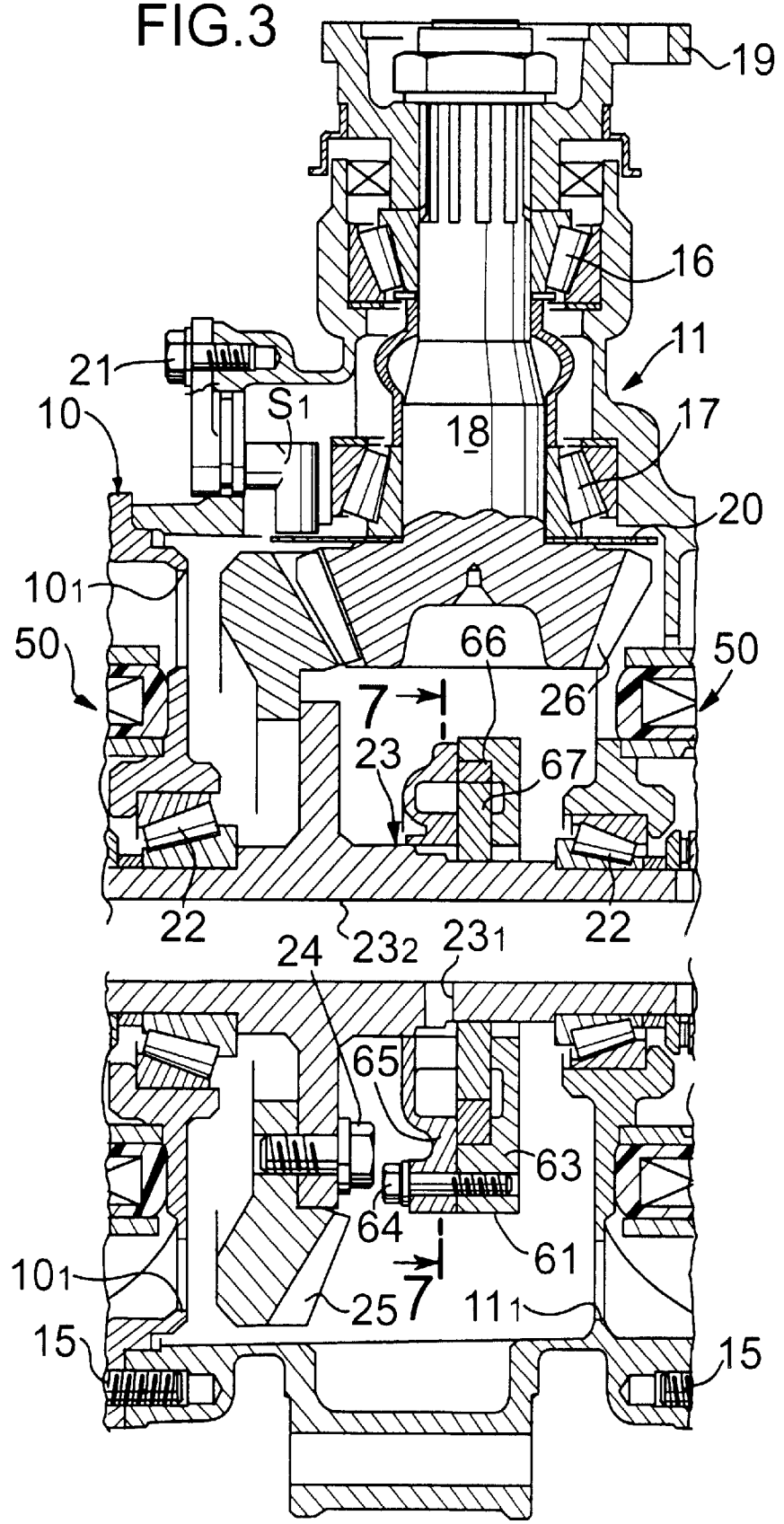
Figure 7:
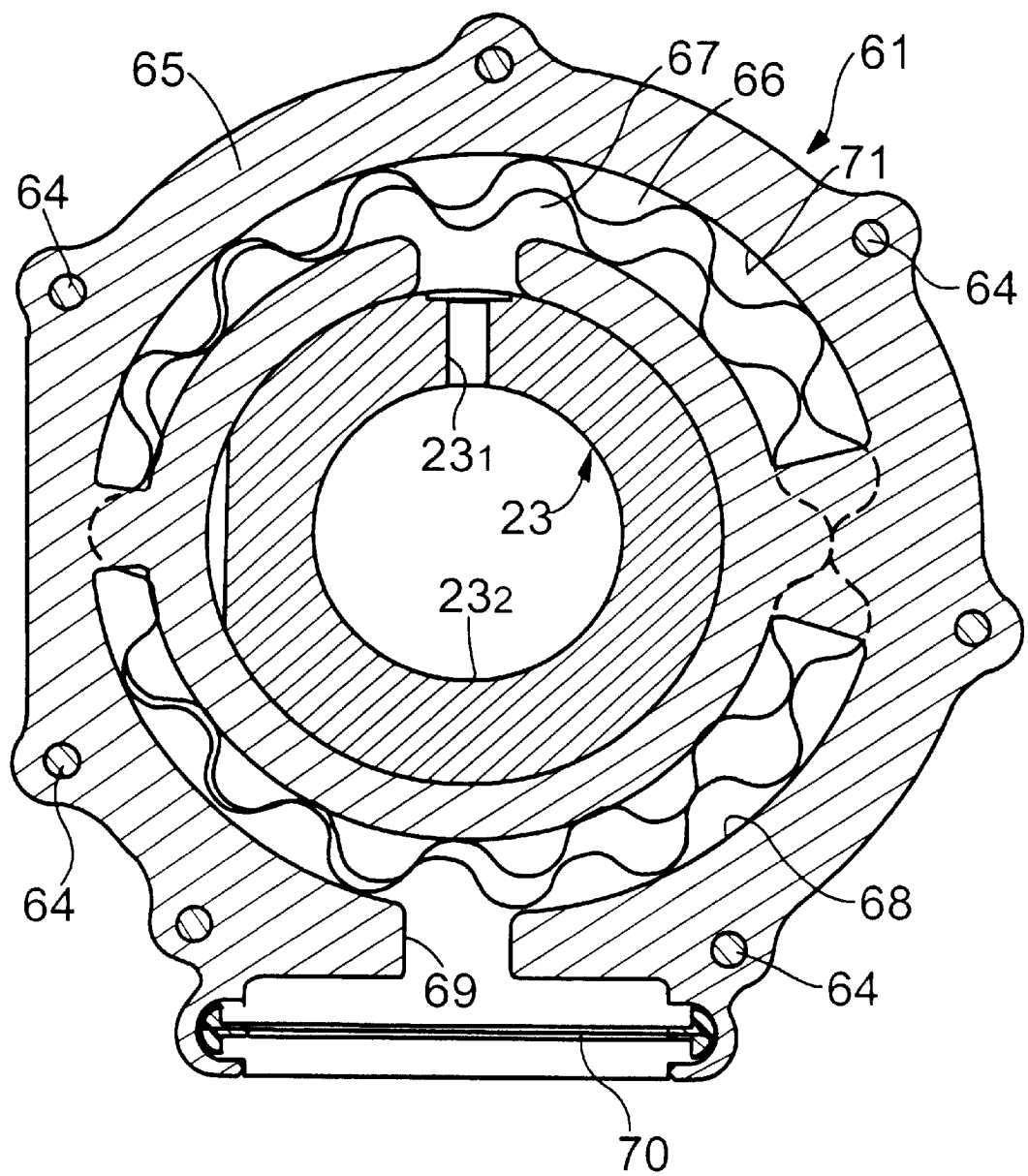

As can be seen from FIGS. 3 and 7, an oil pump 61 accommodated in an internal space in the center casing 11 is a trochoid pump and includes a pump housing 63 fixed to an inner surface of the center casing 11 by bolts (not shown), a pump cover 65 coupled to the pump housing 63 by bolts 64, an internally toothed outer rotor 66 rotatably accommodated within the pump housing 63 and the pump cover 65, and an externally toothed inner rotor 67 fixed to an outer periphery of the clutch drive shaft 23 and meshed with the outer rotor 66.

Lubricating oil is stored in a space below the center casing 11. An oil strainer 70 is mounted in an oil passage 69 extending downwards from an intake port 68 defined below the pump housing 63 and the pump cover 65, and is immersed in the oil. A discharge port 71 is defined above the pump housing 63 and the pump cover 65 to communicate with an oil passage $23_2$ axially passed through the clutch drive shaft 23 through an oil passage $23_1$ radially defined in the clutch drive shaft 23. The internal space in the center casing 11 communicates with an internal space in the left and right side casings $13_L$ and $13_R$ through a plurality of through-bores $10_1$ defined in the intermediate casing 10 and a plurality of through-bores $11_1$ defined in the center casing 11.

As can be seen from FIG. 4, an oil bore $23_3$ radially extending from the oil passage $23_2$ in the clutch drive shaft 23 faces an inner periphery of the thrust bearing 45, and a left end of the oil passage $23_2$ in the clutch drive shaft 23 opens at a location opposed to the right end of the left output shaft $29_L$.

The operation of the embodiment of the present invention having the above-described construction will be described below.

At the start of the vehicle, a driving force from the engine E is first transmitted to the left and right front wheels $W_{FL}$ and $W_{FR}$ through the transmission M, the front differential $D_F$ and the drive shafts $1_L$ and $1_R$. The driving force from the engine E is also transmitted to the rear differential $D_R$ through the propeller shaft 2 to rotate the input shaft 18, the driven bevel gear 26, the follower bevel gear 25 and the clutch drive shaft 23. However, the left and right electromagnetic clutches $C_L$ and $C_R$ are in their non-engaged states and hence, the rear wheels $W_{RL}$ and $W_{RR}$ are not driven. At this time, the rotational speeds of the front wheels are detected by the front wheel speed sensor $S_1$ mounted on the input shaft 18 of the rear differential $D_R$, and the rotational speeds of the rear wheels are detected by the rear wheel speed sensors $S_2$, $S_2$ mounted on the left and right output shafts $29_L$ and $29_R$ of the rear differential $D_R$. However, at a moment when the driving force has been transmitted to the front wheels $W_{FL}$ and $W_{FR}$, the driving force is still not transmitted to the rear wheels $W_{RL}$ and $W_{RR}$ due to the fact that the left and right electromagnetic clutches $C_L$ and $C_R$ are in their non-engaged states. Therefore, a differential rotation is produced between the front wheels $W_{FL}$ and $W_{FR}$ and the rear wheels $W_{RL}$ and $W_{RR}$. When the differential rotation between the front wheels $W_{FL}$ and $W_{FR}$ and the rear wheels $W_{RL}$ and $W_{RR}$ is detected, the left and right electromagnetic clutches $C_L$ and $C_R$ are brought into their engaged states based on a signal from the electronic control unit U, thereby permitting the rotation of the clutch drive shaft 23 to be transmitted to the rear wheels $W_{RL}$ and $W_{RR}$ through the left and right output shafts $29_L$ and $29_R$ and the left and right drive shafts $3_L$ and $3_R$. In this manner, the vehicle V is brought into the four-wheel drive state.

The operation of the electromagnetic clutches $C_L$ and $C_R$ will be described with the left electromagnetic clutch $C_L$ shown in FIG. 4 being taken as an example. When the solenoid 50 is in its non-energized state, the attraction of the armature 54 to the coil housing 47 has been released, and hence, the coil housing 47 and the armature 54 are rotatable relative to each other. In this state, the clutch drive shaft 23, the ball cam mechanism 44, the coil housing 47, the clutch inner 37 and clutch plates 39 are in their integrated states, and the left output shaft $29_L$, the clutch outer 36 and the armature 54 are also in their integrated states. Therefore, the transmission of the power from the clutch drive shaft 23 to the left output shaft $29_L$ has been cut off by slipping of the armature 54 relative to the coil housing 47.

When the coil 52 of the solenoid 50 is energized by a command from the electronic control unit U, the armature 54 is attracted to, and integrated with, the coil housing 47. As a result, the left output shaft $29_L$ is coupled to the stationary cam member 41 of the ball cam mechanism 44 through the clutch outer 36, the armature 54 and the coil housing 47, thereby causing the relative rotations shown by arrows A and B in FIG. 6 to be produced between the stationary cam member 41 and the movable cam member 42 integrated with the clutch drive shaft 32. When the stationary cam member 41 and the movable cam member 42 have been rotated relative to each other, the movable cam member 42 is moved leftwards away from the stationary cam member 41 by a reaction force received by the cam grooves $41_1$ and $42_1$ from the balls 43, and the clutch piston 40 integral with the movable cam member 42 is moved leftwards to bring the clutch disks 38 and the clutch plates 39 into engagement with each other.

Thus, the clutch inner 37 is coupled directly to the clutch outer 36 through the clutch plates 39 and the clutch disks 38, and the left electromagnetic clutch $C_L$ is brought into the engaged state, thereby permitting the rotation of the clutch drive shaft 23 to be transmitted to the left output shaft $29_L$. When the left and right electromagnetic clutches $C_L$ and $C_R$ have been brought into the engaged states in the above manner, the left and right rear wheels $W_{RL}$ and $W_{RR}$ are driven. In this manner, the vehicle V is brought into the four-wheel drive state.

The rear differential $D_R$ is capable of generating a difference between the engagement forces of the left and right electromagnetic clutches $C_L$ and $C_R$ by controlling a value of electric current supplied to the coils 52, 52 of the left and right solenoids 50, 50, so that torque is distributed to the left and right rear wheels $W_{RL}$ and $W_{RR}$, thereby controlling the steering characteristic of the vehicle. A reference yaw rate is calculated based on a steering angle detected by the steering angle sensor $S_3$, a vehicle speed calculated based on outputs from the front wheel speed sensor $S_1$ and the rear wheel speed sensors $S_2$, $S_2$, and a lateral acceleration detected by the lateral acceleration sensor $S_5$, for example, during turning of the vehicle V. This reference yaw rate is compared with an actual yaw rate detected by the yaw rate sensor $S_4$. If the vehicle is in an oversteering tendency or an understeering tendency as a result of the comparison, a control for eliminating the over-steering tendency or the under-steering tendency can be performed.

Specifically, when the vehicle experiences an oversteering tendency, a yaw moment causing the vehicle body to be turned outwards, as viewed during the turning of the vehicle, can be generated to eliminate the over-steering tendency by increasing the engagement force of the electromagnetic clutch $C_L$ or $C_R$ on the inner side during turning of the vehicle, and decreasing the engagement force of the electromagnetic clutch $C_L$ or $C_R$ on the outer side during turning of the vehicle. When the vehicle experiences an under-steering tendency, a yaw moment causing the vehicle body to be turned inwards, as viewed during turning of the vehicle, can be generated to eliminate the under-steering tendency by decreasing the engagement force of the electromagnetic clutch $C_L$ or $C_R$ on the inner side during turning of the vehicle, and increasing the engagement force of the electromagnetic clutch $C_L$ or $C_R$ on the outer side during turning of the vehicle.

Now, when the clutch drive shaft 23 of the rear differential $D_R$ is rotated, the inner rotor 67 and the outer rotor 66 of the oil pump 61 accommodated in the center casing 11 are rotated, thereby causing the oil stored in the center casing 11 to be drawn from the oil strainer 70 via the oil passage 69 into the intake port 68 and supplied from the discharge port 71 via the oil bore $23_1$ into the oil passage $23_2$ defined in the clutch drive shaft 23. A portion of the oil flowing into the oil passage $23_2$ in the clutch drive shaft 23 flows through the oil bores $23_3$, which extend radially from the oil passage $23_2$, to the outside of the clutch drive shaft 23 to lubricate the thrust bearings 45, the tapered roller bearings 22, the ball cam mechanism 44, and the like. Another portion of the oil flowing into the oil passage $23_2$ in the clutch drive shaft 23 flows from the left end of the oil passage $23_2$ to lubricate the clutch disks 38 and the clutch plates 39 of the electromagnetic clutch $C_L$. The oil, after completion of the lubrication, is returned from the left and right side casings $13_L$ and $13_R$ through the through-bores $10_1$ and $11_1$ into the center casing 11.

Since the solenoid 50 and the clutch body 46 are disposed respectively at inner and outer locations in the lateral direction of the vehicle body, as described above, the clutch body 46 disposed at the outer location can be mounted in proximity to the inner wall surface of the left side casing $13_L$, thereby enabling heat generated by the engagement of the clutch disks 38 and the clutch plates 39 to be effectively radiated to the outside of the left side casing $13_L$. Moreover, since the tapered ball bearings 22 for supporting the left end of the clutch drive shaft 23 are disposed to axially overlap the radially inner portion of the solenoid 50, the axial dimension (the lateral dimension) of the rear differential $D_R$ can be reduced by an amount corresponding to the extent of overlap between the tapered ball bearings 22 and the radially inner portion of the solenoid.

Further, since the oil pump 61 is disposed in the location in which it is sandwiched between the left and right electromagnetic clutches $C_L$ and $C_R$, the length of the oil passages for supplying oil from oil pump 61 to the electromagnetic clutches $C_L$ and $C_R$ can be minimized. Moreover, since the oil passage $23_2$ is arranged to extend through the inside of the clutch drive shaft 23, a special piping is not required, but also the resistance to the flowing of oil can be decreased.

In addition, if the driven bevel gear 26 and the follower bevel gear 25 are disposed in the center casing 11, a dead space with two ways surrounding by the bevel gears 25 and 26 is produced, but it is possible to prevent an increase in size of the center casing 11 by disposing the oil pump 61 within such dead space. Particularly, since the oil pump 61 is comprised of the trochoid pump with its inner rotor 67 fixed to the clutch drive shaft 23, the layout of the oil pump 61 in the dead space is facilitated. Moreover, the oil passage 69 connected to the intake port 68 of the oil pump 61 opens directly into the bottom of the center casing 11 and hence, it is possible to effectively prevent the inclusion of air during inclination of the vehicle V. Further, the follower bevel gear 25 and the oil pump 61 disposed in the internal space in the center casing 11 exhibit a function of a baffle plate and hence, it is possible to inhibit the waving of the oil surface to further effectively prevent the inclusion of air.

Although the embodiment of the present invention has been described in detail, it will be understood that the present invention is not limited to the above-described embodiment, and various modifications may be made without departing from the spirit and scope of the invention defined in claims.

For example, the clutch drive shaft 23 is supported on the tapered roller bearings 22 in the embodiment, but in place of the tapered roller bearings 22, any other types of bearings, such as ball bearings, may be employed. The solenoid 50 and the tapered roller bearing 22 are only required to laterally overlap each other at least in part. The power transmitting system for a vehicle according to present invention is not limited to the use for a front engine vehicle, and is also applicable to a rear engine vehicle and a midship engine vehicle. Thus, the driven wheels are also not limited to the front wheels $W_{FL}$ and $W_{FR}$, and may be the rear wheels $W_{RL}$ and $W_{RR}$.

What is claimed is:

1. A power transmitting system for a vehicle, comprising
    an input shaft to which a driving force from an engine is inputted;
    a clutch drive shaft extending laterally of a vehicle body and driven by the input shaft;
    left and right output shafts coaxially disposed on left and right opposite sides of said clutch drive shaft;
    left and right electromagnetic clutches disposed between said clutch drive shaft and said respective output shafts;
    said left and right electromagnetic clutches each including a clutch body which is operable to transmit a driving force from said clutch drive shaft to an adjacent one of said output shafts and which is operated by an associated one of a pair of left and right annular solenoids, respectively;
    said left and right solenoids each being disposed laterally inboard of the left or right clutch body with which each is associated, and left and right bearings for supporting opposite ends of said clutch drive shaft being disposed radially inside said left and right solenoids.

2. A power transmission system for a vehicle according to claim 1 including casing means forming an oil containment reservoir traversed by said clutch drive shaft, and an oil pump disposed intermediate opposite ends of said clutch drive shaft and operative to deliver oil from said reservoir to said left and right electromagnetic clutches.

3. A power transmission system for a vehicle according to claim 2 in which said clutch drive shaft is formed as a hollow member and contains means for conducting oil therethrough from said oil pump to said left and right electromagnetic clutches.

4. A power transmission system for a vehicle according to claim 2 in which said oil pump comprises a casing surrounding said clutch drive shaft and having a rotor fixed to said clutch drive shaft for rotation therewith.

5. A power transmitting system for a vehicle, comprising
    an input shaft to which a driving force from an engine is inputted;
    a clutch drive shaft extending laterally of a vehicle body and driven by the input shaft;
    left and right output shafts coaxially disposed on left and right opposite sides of said clutch drive shaft;
    left and right electromagnetic clutches disposed between said clutch drive shaft and said respective output shafts;
    said left and right electromagnetic clutches each including a clutch body which is operable to transmit a driving force from said clutch drive shaft to an adjacent one of said output shafts and which is operated by an associated one of a pair of left and right annular solenoids, respectively;
    said left and right solenoids each being disposed laterally inboard of the left or right clutch body with which each of said solenoids is associated.

6. A power transmission system for a vehicle according to claim 5, further comprising left and right bearings for supporting opposite ends of said clutch drive shaft, each of said bearings being disposed radially inboard of said associated left or right solenoid.

7. A power transmission system for a vehicle according to claim 5 including casing means forming an oil containment reservoir traversed by said clutch drive shaft, and an oil pump disposed intermediate opposite ends of said clutch drive shaft and operative to deliver oil from said reservoir to said left and right electromagnetic clutches.

8. A power transmission system for a vehicle according to claim 7 in which said clutch drive member is formed as a hollow member and contains means for conducting oil therethrough from said oil pump to said left and right electromagnetic clutches.

9. A power transmission system for a vehicle according to claim 7 in which said oil pump comprises a casing surrounding said clutch drive shaft and having a rotor fixed to said clutch drive shaft for rotation therewith.

\* \* \* \* \*